United States Patent [19]  
Rau et al.

[11] 4,003,785
[45] Jan. 18, 1977

[54] REACTOR CORE MELT CONTAINMENT RECEPTACLE

[75] Inventors: Peter Rau, Mittelehrenbach near 89, Germany; Kevin Hunt, Macclesfield, England

[73] Assignee: Siemens Aktiengesellschaft, Munich, Germany

[22] Filed: Apr. 19, 1974

[21] Appl. No.: 462,433

[30] Foreign Application Priority Data

Apr. 19, 1973 Germany .......... 2320091

[52] U.S. Cl. .......... 176/38; 176/87
[51] Int. Cl.² .......... G21C 9/00
[58] Field of Search .......... 176/37, 38, 40, 87

[56] References Cited

UNITED STATES PATENTS

| 3,378,452 | 4/1968 | Costes | 176/40 |
| 3,607,630 | 9/1971 | West et al. | 176/38 |
| 3,629,064 | 12/1971 | Zivi | 176/38 |
| 3,702,802 | 11/1972 | Jansen, Jr. | 176/38 |
| 3,719,556 | 3/1973 | Snyder et al. | 176/38 |

Primary Examiner—Samuel W. Engle
Assistant Examiner—Ralph Palo
Attorney, Agent, or Firm—Kenyon & Kenyon Reilly Carr & Chapin

[57] ABSTRACT

A reactor core melt containment receptacle for use beneath a reactor core so that if the core overheats and melts and falls, the resulting core melt is contained by the receptacle, the latter having a bottom wall and an upstanding side wall, the latter being high enough so that the melt forms a melt level below its top. These walls are water-cooled to cool a melt in contact therewith. In addition, the receptacle has water-cooled elements extending upwardly from the bottom wall to above the melt level and spaced from the side wall. In this way heat is removed from the core melt both internally within the melt as well as via the receptacle bottom and side walls. The water-cooled elements extending above the melt level, absorb the heat radiated from the top surface of the melt, upward heat radiation being further reduced by transverse heat shields connected to the tops of the elements. Other features are included.

8 Claims, 5 Drawing Figures

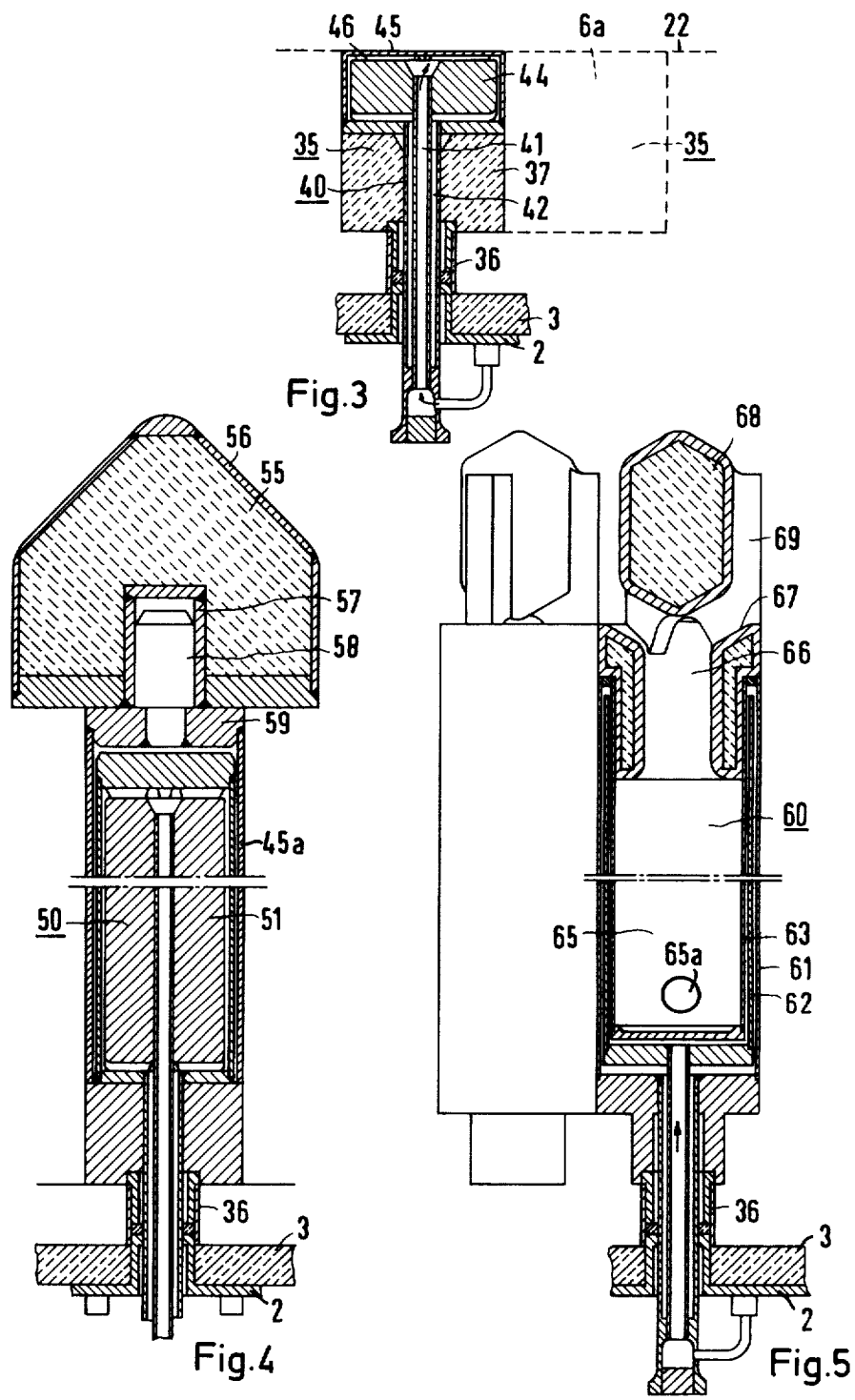

REACTOR CORE MELT CONTAINMENT RECEPTACLE

BACKGROUND OF THE INVENTION

In the event of a loss-of-coolant accident, a nuclear reactor core may overheat, its fuel rod casings and nuclear fuel within these casings being capable of reaching temperatures causing melting and the formation of a falling core melt retaining its residual heat and decay heat. Such a falling core melt must be contained before it can contact and possibly melt through the bottom of the pressure vessel containing the core.

German Offenlegungsschrift No. 2,035,089 suggests a reactor core melt containment receptacle having water-cooled bottom and side walls. A water tank positioned above the receptacle connects with the inlets of water cooling pipes in its walls, the outlets for the pipes connecting with a standpipe which extends upwardly to above the level of this water tank. A core melt falling into this receptacle heats the water which by thermosiphon action rises in the standpipe with the cold water descending from the tank.

The above receptacle is not suitable for use under the core of a high power breeder reactor. In this case the mass of the core and the residual and decay heat are so large that the bottom and side wall cooling alone cannot effectively abstract the heat with necessary rapidity. The receptacle must be deep to contain the core melt volume and removal of the interior heat from the melt by the water-cooled bottom and side wall is not adequate. This results in the discharged water being in the form of steam which rises and escapes from the standpipe to fill the reactor containment structure, which is very undesirable. Upward radiation of heat from the top of the core melt is intense and may possibly damage the heavy structural elements required for support of the core.

SUMMARY OF THE INVENTION

The object of the present invention is to provide such a containment receptacle that can be used safely and reliably below the core of a high-power breeder reactor.

According to the invention, this object is attained by a receptacle having a water-cooled bottom and side wall. In addition, water-cooled elements extend upwardly from the bottom wall to above the melt level, these elements being spaced from the side wall. In particular, the elements extend vertically and are in the form of individual interspaced columns with their tops supporting individually transverse thermal shields. In one form, a plurality of such columns form a support for a common transverse heat shield. The heat shield is water-cooled in one instance, and in another instance, it is cooled by having a meltable surface which is melted by the falling core melt with the melting absorbing heat.

The heat shields are in effect either individual roofs over the columns, or one continuous common roof supported by a plurality of the columns.

With this receptacle, the core melt falls on the roofs or heat shields and receives a primary cooling, after which it falls to the receptacle where the melt heat is removed not only by conduction to the water-cooled walls, but also internally via the water-cooled elements or columns.

Furthermore, because the columns extend above the melt level, heat radiated upwardly from the melt is absorbed by the upwardly extending columns or equivalent elements, which may extend well above the melt level. The heat shields or roofs further retard upward radiation.

In the foregoing fashion, the core melt is rapidly cooled while its upward heat radiation is reduced to a point where the core support structural element which remain in position after the melted core components fall, is possibly not damaged to any material extent.

BRIEF DESCRIPTION OF THE DRAWINGS

The preferred mode for carrying out the invention is schematically illustrated by the accompanying drawings, in which:

FIG. 3 is a vertical section showing the construction of the bottom wall of the receptacle;

FIG. 4 is a vertical section of a modification; and

FIG. 5 is a vertical section showing a modified bottom wall construction.

DETAILED DESCRIPTION OF THE INVENTION

Figure 1:
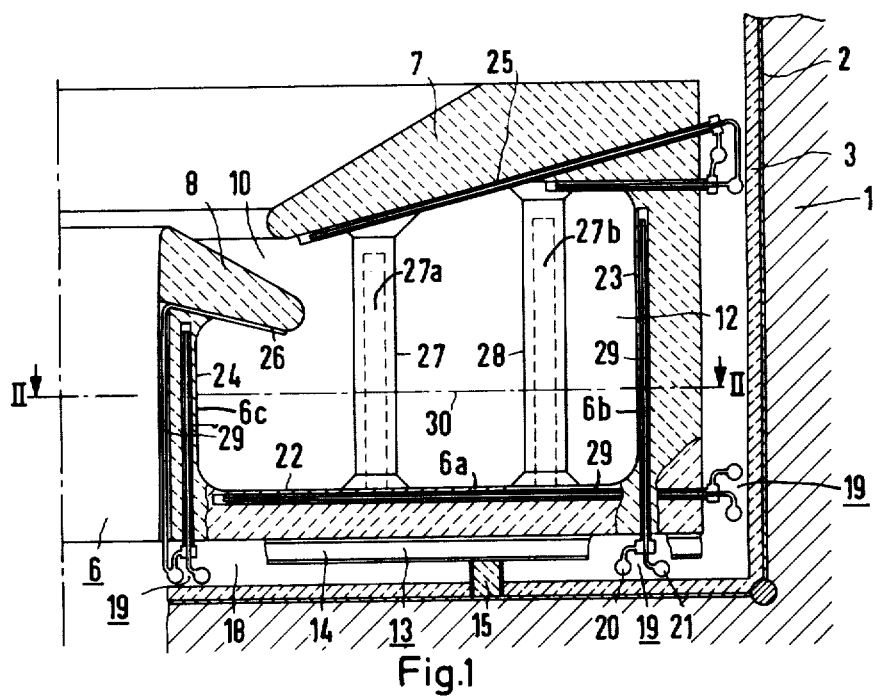
FIG. 1 is a vertical section showing half of the new receptacle, it being circular with its parts symmetrically arranged and thus avoiding the need for showing the entire receptacle.
Figure 2:
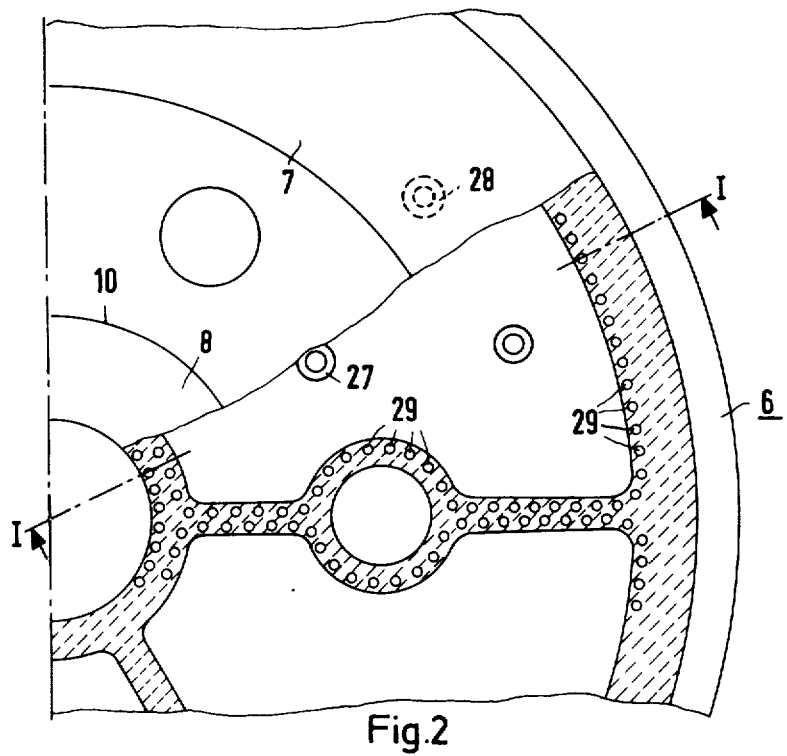
FIG. 2 is a cross section taken on the line II—II in FIG. 1.

In FIG. 1 the concrete reactor pressure vessel 1 is clad with metal sheet 2 over which is layed thermal insulation 3. This pressure vessel contains the core through which the gas coolant, such as carbon dioxide or helium, is passed to cool the core. If the circulation of this coolant fails, the core can overheat and fall in the form of a core melt which must be contained.

The receptacle 6 is positioned beneath the core (not shown) and comprises a refractory molding, made largely from graphite, providing a bottom wall 6a and an upstanding side wall 6b. The receptacle is annular in shape, the wall 6b being an outer cylindrical wall, an inner cylindrical wall 6c serving to complete the receptacle's annular space which is to contain the core melt. The cylindrical wall 6c has its interior filled by a receptacle support post (not shown) which normally holds the receptacle up from the bottom wall of the pressure vessel adjacently beneath the core.

When the melt is in this receptacle 6, direct upward heat radiation is prevented by downwardly declining annular shields or roofs 7 and 8. The shield 7 extends radially inwardly from the top of the outer wall 6b and then declines until its inner periphery overlaps the outer periphery of the shield 8. This shield 8 extends inwardly from the inner wall 6c, which is not as high as the wall 6b, and declines until its inner periphery is overlapped by the inner annular portion of the declining shield 7. The two overlapping portions are vertically interspaced to define an entrance 10 for the core melt. The annular space for containing this melt is indicated by the numeral 12.

The drawings are largely schematic and, therefore, the support post which fits inside of the inner cylindrical core 6c is not shown. Instead, to show that the receptacle is supported, a support structure 13 is schematically illustrated as consisting of beams 14 and heat insulating support blocks 15, this providing a space 18 in which cooling systems 19 are arranged. When the receptacle is supported by the post, this space 18 is, of course, substantially larger.

The cooling systems 19 are identical wherever they are required, each comprising inlet and outlet manifolds 20 and 21 from which coolant lines 29 lead to the different parts of the receptacle which adjoin the interior 12 of the tray. As illustrated, the pipes 29 are arranged within openings in the walls 6c and 6b and the bottom wall 6a. The coolant may be water for example, although systems with a high boiling point can also be used. It can be seen that the invention provides for cooling not only the bottom wall 6a but the upstanding side walls 6b and 6c as well. The walls 6c and 6b provide the vertical inner surfaces 23 and 24 which extend well above the level 30 of the core melt. This level can be calculated from the known volume of the core components forming the melt.

In addition to the above cooling above the melt level, water cooling pipes 25 and 26 extend under the bottom surfaces of the shields 7 and 8. Therefore, all of the inner surfaces of the entire receptacle construction are water-cooled.

Furthermore, a plurality of vertical tubular columns 27 and 28 which are distributed throughout the annular space 12 extend upwardly from the bottom wall 6a to the underside of the upper shield or roof 7 to support the latter, and as indicated by the dotted lines, the interiors 27a and 27b of these columns define water-cooling spaces for containing circulating water coolant.

With the core melt filling the receptacle up to the level indicated at 30, its upwardly radiated heat is greatly reduced by the vertical elements or columns 27 and 28 which extend well above the melt level. The heat is further removed by the upwardly extending surfaces 23 and 24 provided by the walls 6c and 6b. The cooling pipes 25 and 26 of the shields 7 and 8 provide still further cooling of the heat radiation which, in any event, is prevented from radiating directly upwardly by the overlapping shields 7 and 8.

FIG. 3 shows the preferred mode for making the bottom wall 6a of the receptacle. With this construction the coolant pipe arrangement 29 is replaced by the bottom wall being made by a plurality of individual interfitting block elements. Each element comprises a heat insulating support tube 36 supporting a metal or graphite block 37 containing a double wall tube 40 forming an inner coolant inlet channel 41 and an outer coolant outlet channel 42. A distributor head 44 distributes the coolant beneath an outer metal cladding 45 which surrounds the distributor head 44. The cladding 45 may be braced by ribs 46 extending between the cladding and the top of the head 44 to sustain the weight of the core melt. With this receptacle bottom, intensive cooling of the core melt can be obtained.

Certain of the blocks 35 may be replaced by ones that extend upwardly well above the melt level, an example being provided by FIG. 4. Here the upward extension is provided by a distributor block 51 that is high enough to extend well above the melt level, 45a indicating the cladding providing the water-cooling passages. Here again, the radiated heat from the melt can be absorbed at a position well above the melt level and, of course, within the melt itself. A graphite shielding member 55 having metal cladding 56 has a recess 57 by which it is fitted to a pin 58 connected by a member 59 with the top of this vertical element 50. In this instance, the part 55 on which the core melt can fall is not water-cooled; in this instance, the metal cladding 59 melts and absorbs heat from the core melt. In other words, a meltable element is provided in this instance for contact by the core melt.

In the embodiment of FIG. 5 a receptacle bottom is again composed of individual elements 60. In all cases the bottom elements may have a hexagonal cross section and be closely interfitted to form the bottom wall. In addition to the concentric tubes 61, 62 and 63, by which the coolant passages are formed, the bottom elements in this instance form a cavity 65 for receiving the core melt. The top of this cavity has a constricted entrance 66 made, for example, of graphite, and attached to the upper end of the tubes. Above the opening 66 a shield 68 is provided, attached by means of ribs 69. In this instance the elements 60 provide via their interiors 65 receptacles for the core melt and vertical cooling surfaces which extend well above the melt level. The cavities 65 may be interconnected via openings 65a to assure that all of the spaces 65 contain the melt at the same level.

In all instances, the core melt is penetrated by water-cooled surfaces cooling the melt throughout its interior. In all cases upward head radiation from the core melt is prevented; in FIG. 1 the roofs or shields 7 and 8 obstruct upward head radiation; in FIG. 4 this function is performed by the shield 55, there being a multiplicity of the elements 50; and in FIG. 5 the upward shield is provided by the part 68. In all cases, the falling core contacts the shielding element first, and these elements are either water-cooled or provided with parts which are meltable to absorb heat from the core melt.

What is claimed is:

1. A reactor core melt containment receptacle for use beneath a reactor core, said receptacle comprising a bottom wall, an outer annular wall and at least one inner wall surrounded by and laterally spaced from said outer annular wall, said outer and inner walls having tops and extending upwardly from said bottom wall and forming a lateral space between each other for containing a core melt at a level below said tops, a declining annular roof extending radially inwardly from the top of said outer wall and above said level having a bottom surface forming a first heat shield against upward heat radiation from said core melt, a declining roof extending towards said outer wall from said inner wall and above said level having a bottom surface forming a second heat shield against upward heat radiation from said core melt, said roofs having terminating edge portions forming a space therebetween above said level and through which a core melt can fall into said lateral space, said bottom and said outer and inner walls having surfaces heated by said core melt when contained in said lateral space, and means for cooling all of said surfaces.

2. The receptacle of claim 1 in which a plurality of interspaced columns extend from said bottom wall to said bottom surface forming said first heat shield, said columns supporting the inwardly extending one of said roofs and said columns having surfaces contacted by and exposed to radiated heat of said melt when contained in said lateral space, and means for cooling the columns' said surfaces.

3. The receptacle of claim 1 in which the inner wall's said surface is substantially cylindrical and is centrally positioned within said outer wall and said terminating edge portions overlap each other and are vertically interspaced.

4. The receptacle of claim 1 in which said bottom comprises a plurality of interfitting blocks and heads, said heads being positioned on said blocks and being covered by metal cladding.

5. The receptacle of claim 4 in which said metal cladding internally forms spaces for flowing coolant.

6. The receptacle of claim 4 in which a portion of said blocks have lengthened portions extending upwardly from the others and position the heads thereon at a level above the rest of said heads.

7. The receptacle of claim 6 in which the heads on said lengthened portions extend radially therefrom to form bottom surfaces and said lengthened portions position these heads and their bottom surfaces above said level of a melt contained in said lateral space, so that the just-named bottom surfaces form further heat shields against upward heat radiation from a core melt contained in said lateral space.

8. The receptacle of claim 4 in which at least a portion of said blocks individually form cavities for receiving portions of said core melt, and core melt passages to said cavities are formed between said heads and blocks.

* * * * *